US007079701B2

(12) United States Patent
Grindstaff et al.

(10) Patent No.: US 7,079,701 B2
(45) Date of Patent: Jul. 18, 2006

(54) CONCEALED OBJECT RECOGNITION

(75) Inventors: Gene Arthur Grindstaff, Decatur, AL (US); Susan Heath Calvin Fletcher, Huntsville, AL (US); Therman Ward McKay, III, Athens, AL (US)

(73) Assignee: Intergraph Software Technologies, Las Vegas, NV (US)

( * ) Notice: Subject to any disclaimer, the term of this patent is extended or adjusted under 35 U.S.C. 154(b) by 610 days.

(21) Appl. No.: 10/237,249

(22) Filed: Sep. 6, 2002

(65) Prior Publication Data

US 2003/0048282 A1    Mar. 13, 2003

Related U.S. Application Data

(60) Provisional application No. 60/318,164, filed on Sep. 7, 2001.

(51) Int. Cl.
*G06K 9/40* (2006.01)
*G09G 5/00* (2006.01)

(52) U.S. Cl. ...................................... 382/260; 345/629

(58) Field of Classification Search ................ 382/162, 382/168, 170, 260, 262, 263, 264, 272, 276, 382/277, 305, 275; 358/515, 519, 521, 522, 358/523, 530, 3.26; 345/589, 590, 591, 619, 345/620, 629; 396/567, 569, 604, 612; 378/9
See application file for complete search history.

(56) References Cited

U.S. PATENT DOCUMENTS 5,974,111 A    10/1999  Krug et al.  .................... 378/57

(Continued)

FOREIGN PATENT DOCUMENTS

GB          2341507         3/2000

OTHER PUBLICATIONS

Shteinshleiger, V.B., et al., "A New Type of Device to Locate Objects Hidden Under the Clothes of People," *2001 CIE International Conference on Radar Proceedings,* 2001 CIE International Conference on Radar Proceedings, Beijing, China, Oct. 15-18, 2001, pp. 227-230.

(Continued)

*Primary Examiner*—Amir Alavi
(74) *Attorney, Agent, or Firm*—Bromberg & Sunstein LLP

(57) ABSTRACT

A method for viewing a first object that is obstructed by a second object. In such a method, the first object has a contrasting color to the second object and the second object is constructed from a material that allows visible light to pass therethrough. The amount of visible light that passes through the second object is not enough such that the first object is visible to the human eye. The method involves taking a digital image of the first and second object using a visible light sensor, such as a CCD camera sensor. The digital image data that is received into a computer system contains both first object data and second object data. It should be understood that the fist object data and the second object data include color information. The amount of contrast between the first and the second object should be approximately 10% of the total scale such that on a 256 color scale the difference is approximately 25 levels. The computer system substantially filters out the second object data and then the values associated with the first object data are increased until the data is visibly displayable.

51 Claims, 6 Drawing Sheets

U.S. PATENT DOCUMENTS

| | | | | |
|---|---|---|---|---|
| 6,018,562 | A * | 1/2000 | Willson | 378/9 |
| 6,108,576 | A | 8/2000 | Alfano et al. | 600/476 |
| 6,683,995 | B1 * | 1/2004 | Ford et al. | 382/275 |
| 6,705,777 | B1 * | 3/2004 | Corbin et al. | 396/569 |
| 6,786,655 | B1 * | 9/2004 | Cook et al. | 355/40 |
| 6,805,501 | B1 * | 10/2004 | Winberg et al. | 396/612 |
| 6,913,404 | B1 * | 7/2005 | Patterson et al. | 396/604 |
| 6,916,125 | B1 * | 7/2005 | Winberg et al. | 396/567 |
| 6,943,920 | B1 * | 9/2005 | Edgar | 358/3.26 |
| 2003/0048282 | A1 * | 3/2003 | Grindstaff et al. | 345/629 |

OTHER PUBLICATIONS

International Search Report, dated Jan. 9, 2003; received Jan. 14, 2003.

\* cited by examiner

CONCEALED OBJECT RECOGNITION

PRIORITY

This application claims priority from U.S. Provisional Application No. 60/318,164, filed Sep. 7, 2001 entitled "Method, Device and Computer Program Product for Analysis of Video Images", the full disclosure of which is hereby incorporated by reference herein.

TECHNICAL FIELD

The present invention relates to analysis of digital images. More specifically, the present invention relates to viewing of obstructed objects in digital images.

BACKGROUND

Systems have been designed for viewing objects which are obstructed by other objects. For instance, x-ray detectors and infra-red detectors allow a user to subject an object to either infra-red light, x-rays, or another signal other than visible light in order to expose obstructed objects. Such systems require that the object is exposed to the signal in order for the object to be observed. It would be desirable to have a method and system for viewing obstructed objects within a digital image without having to first expose the objects to a created signal.

SUMMARY OF THE INVENTION

The invention in one embodiment is a method for viewing a first object that is obstructed by a second object. In such a method the first object has a contrasting color to the second object and the second object is constructed from a material that allows visible light to pass therethrough. The amount of visible light that passes through the second object is not enough such that the first object is visible to the human eye. The method involves taking a digital image of the first and second object using a visible light sensor, such as a CCD camera sensor. The digital image data that is received into a computer system contains both first object data and second object data. It should be understood that the first object data and the second object data include color information. The amount of contrast between the first and the second object should be approximately 10% of the total scale such that on a 256 color scale the difference is approximately 25 levels. The computer system substantially filters out the second object data and then the values associated with the first object data are increased until the data is visibly displayable. The computer system may create a histogram of the digital image data to allow a user of the system to select second object data based upon the histogram. In such an embodiment, the histogram is displayed to the user and a user selection mechanism is provided for selecting data from the histogram. The step of substantially filtering out the second object data and increasing the first object data may be achieved by increasing gamma correction to a value that is outside of the range of current graphics programs. For example, the gamma correction value may be set to a value above 2.5 and more generally in the range above 6. Filtering of the second object data can also be achieved by increasing the brightness in combination with increasing the gamma correction value.

The first object data is generally increased such that the original first object data is mapped to values where the contrast between data levels is visible to the human eye when the first object data is displayed on a display device. The mapping is also such that the original values that are low level light values which cannot be perceived when displayed on a display device are mapped to values that can be perceived by a human eye.

The method may include the step of converting the color information to greyscale before filtering the second object data and increasing/remapping the color information of the first object data.

The computer system may identify whether the first object is lighter than the second object or darker than the second object. If the second object is substantially lighter than the first object, the system may invert the first and second object data such that the second object appears darker when represented on a display device prior to filtering. The second object data may be filtered by decreasing all of the values of the second object data until the values are that for black which generally is value 0 on a scale from 0–255.

The methodology as described may also be created in a computer program product for use with a computer wherein the computer program product contains computer code thereon. The method in one embodiment is completely automated. The methodology may also be borne out in a system that includes a camera for taking a digital image using visible light wherein the digital image that is created by the digital camera contains data representative of the first object and of the second object. The system further includes a processor for receiving the digital image and processing the digital image to filter out the second object data and increasing the values of the first object data until visibly displayable. The system may be automated or receive user activation signals for the identification of data as belonging to the second object and also gamma correction values for example.

BRIEF DESCRIPTION OF THE DRAWINGS

The features of the invention will be more readily understood by reference to the following detailed description, taken with reference to the accompanying drawings, in which.

DETAILED DESCRIPTION OF SPECIFIC EMBODIMENTS

As used in the following text, the term "digital video" implies a digital representation of a sequence of images which may be temporally displayed on a display device. Typically, digital video contains a plurality of frames wherein each frame represents a separate image. The frames may be further subdivided such that the frames are made up of a series of pixels. As used in the following description the term "pixel" shall mean a single point of an image. The greater the number of pixels that are contained in an image, the greater the resolution of the video. Resolutions are conventionally referenced by length and width measurements of the number of pixels, for example, in a resolution of 800×600, there are 800 pixels along the length of an image by 600 pixels along the width of the image.

The term "brightness" shall mean the attribute of a visual sensation according to which an area appears to emit more or less light. Brightness is a relative expression of the intensity of the energy output of a visible light source. The term "gamma" and "gamma correction value" shall mean the exponent of the luminance power law response to voltage. The term "gamma correction" shall mean the insertion of a nonlinear output-input characteristic for the purpose of changing the system transfer characteristic. The term "normal video signal" shall mean a video signal that is produced using visible light as opposed to infrared or subjecting the subject matter of the image to some type of signal other than visible light waves. The term "porous material" is any material that allows a portion of direct light to reflect through the material.

In an embodiment of the present invention, a method of detecting concealed objects using analysis of video image frames is presented. Under certain conditions, objects under a porous material can be detected in a video frame. Examples of porous materials include clothing (cotton, silk etc.), fabric and glass. The concealed object can be displayed if the concealed object and the porous material are of contrasting colors. A contrasting color is a color which when transferred to a greyscale varies by approximately 10% in grey scale level. For example, if there are 256 greyscale levels the porous material and the concealed object should vary by 25 levels or more.

Figure 1:
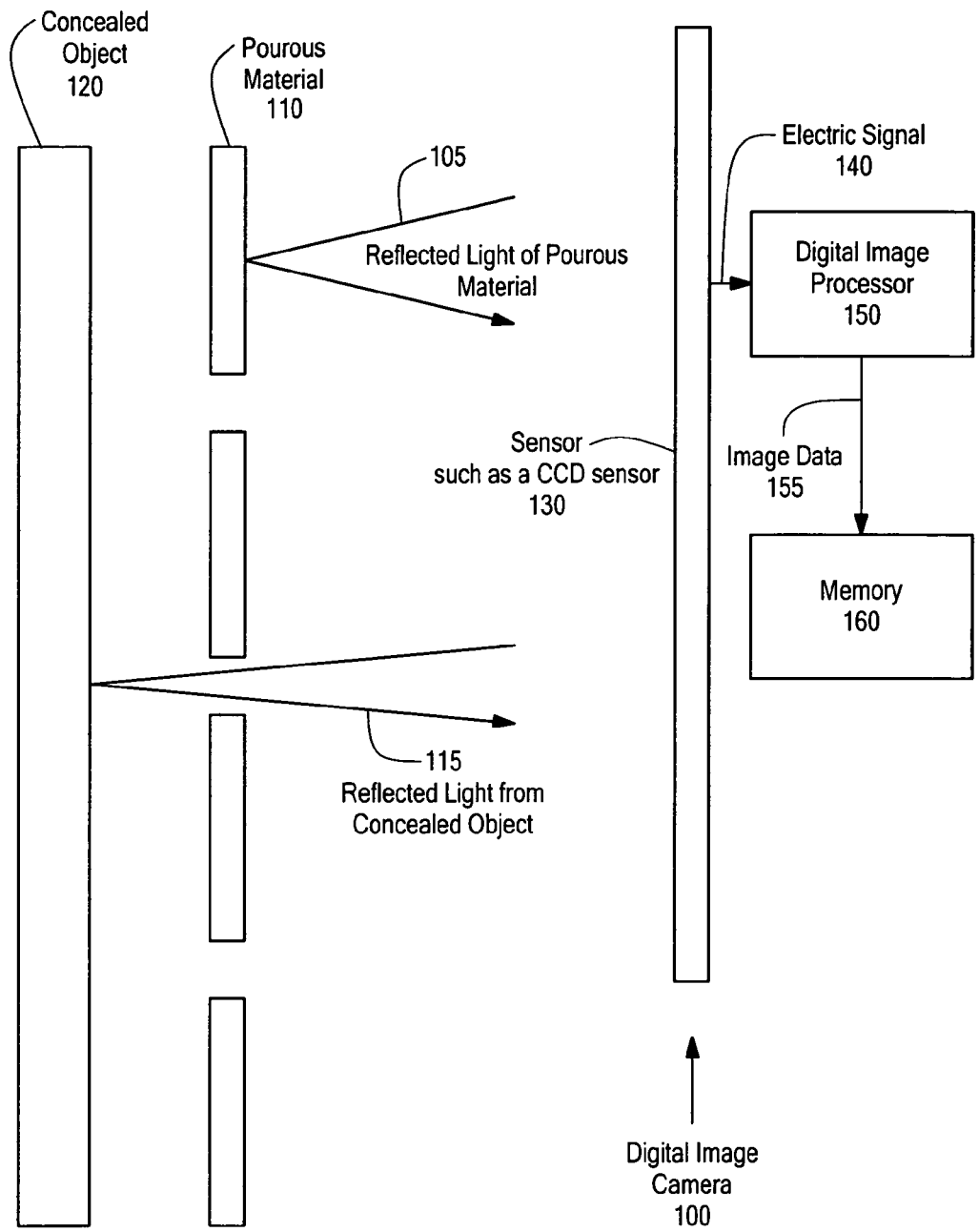
FIG. 1 shows one environment for implementing a first embodiment for concealed object recognition.

FIG. 1 shows a digital image camera 100 capturing image data that is the result of reflected light. The majority of the direct light 105 is reflected off of a porous object 110. A small portion of the direct light 115 passes through the porous material and is reflected off of the concealed object 120. Some of the reflected light from the concealed object passes through the porous material and is captured by a video image sensor 130. The video image sensor 130 turns the reflected light 105, 115 from both the porous material and the concealed material into an electric signal 140 which is processed by a digital image processor 150. The digital image processor 150 then sends the image data 155 to memory in a digital format such as RGB for each pixel/receptor in the sensor. When the image data 155 is then displayed on a display device the concealed object is not visible, due to the fact that the pixel values which represent the porous material are much greater than that for the concealed object. As a result, the light for the porous material that is emitted from the display device engulfs the emitted light which results from the pixels values of the concealed object. Therefore, the human eye cannot perceive the concealed object. In general, the human eye is not capable of observing intensity levels below 80 on a greyscale between 0–255. As such, values below 80 will appear to be black. In FIG. 1 the concealed object is shown to be a solid object, although the concealed object could also be porous.

Figure 2:
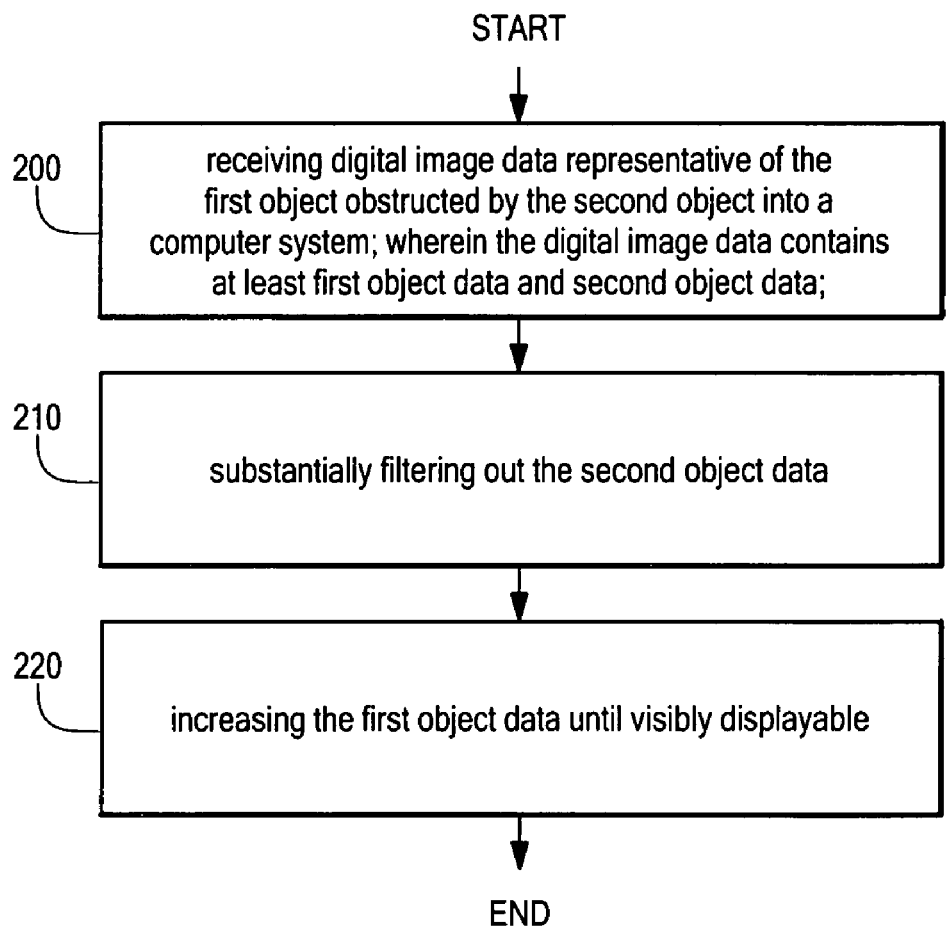
FIG. 2 is a flow diagram illustrating recognition of a first object concealed by a second object from a video image.

FIG. 2 shows a flow chart of the steps that are taken for altering digital image data in order to display a concealed object. The method is performed on a computer system using video or image editing software. First information which is digital data that is representative of a first digital image/frame is received 200. The data is then converted from color digital image data to greyscale data. The digital greyscale data is then filtered 210. Filtering occurs in the following manner. If the porous object is not black, all of the pixel values are adjusted such that the pixel values associated with the porous object default to black. This may be done by applying a filter that cuts off values above a threshold greyscale value. Then the remaining values which are generally representative of the concealed object are increased 220. The remaining values which have not been set to 0 (black) are increased such that the values are in a range which is visibly perceptible. For example, assuming a greyscale between 0–255 all of the values would be increased above 100 for example. The values are thus remapped, such that the values are spread out causing the levels of contrast to be perceivable and the overall brightness/intensity level for the pixels representative of the concealed object are increased such that the pixels are visible to the human eye. It should be understood by one of ordinary skill in the art that the human eye does not readily differentiate between pixels that have closely proximate greyscale values. Therefore, one object of the filter is to spread out the low level pixel values such that the human eye can perceive the contrast.

Figure 3:
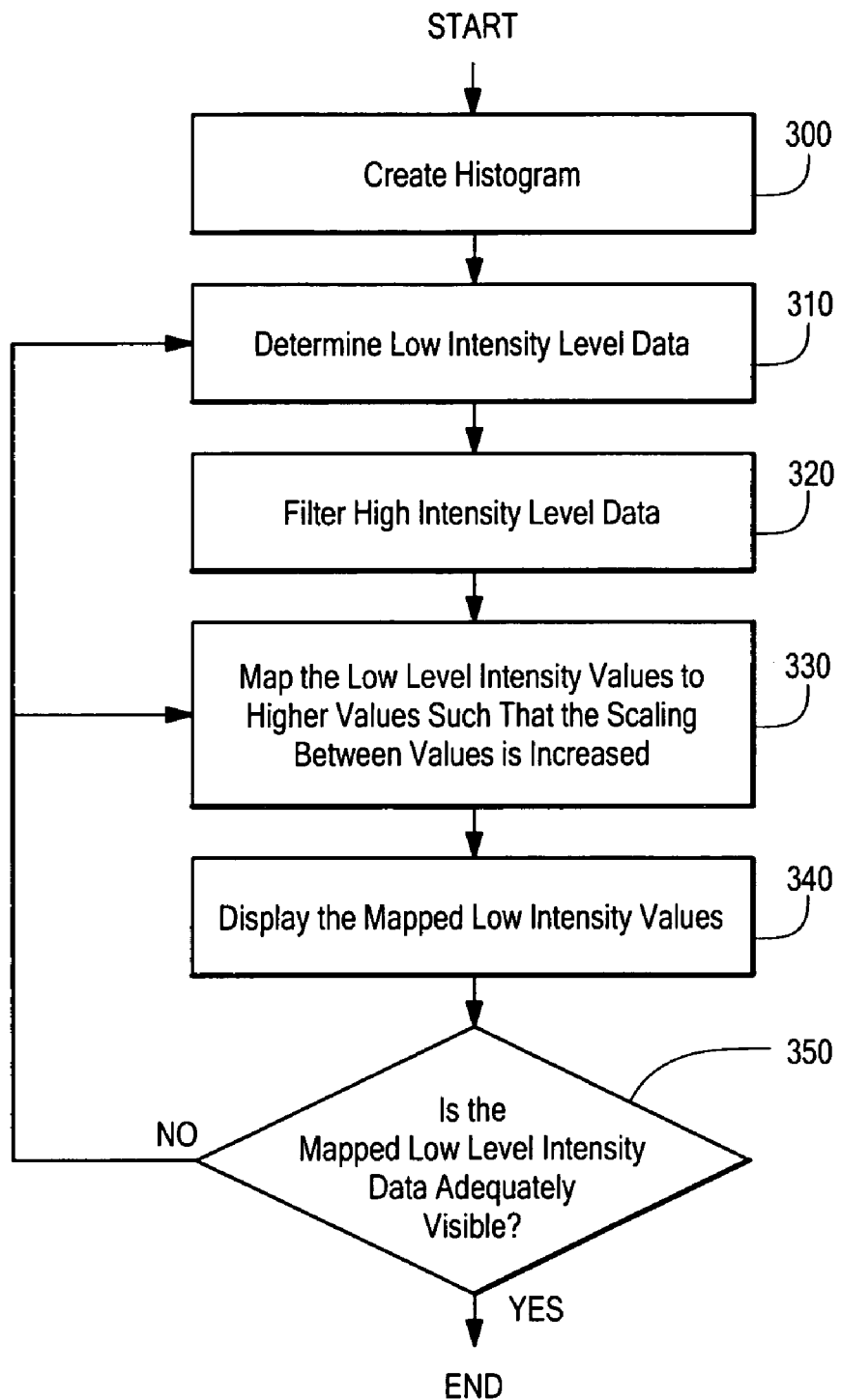
FIG. 3 shows a more detailed flowchart of the steps that are taken for concealed object recognition.

FIG. 3 shows a more detailed flowchart of the steps that are taken for concealed object recognition. As previously stated once the digital image information is received into a computer system, the color information is converted to greyscale information by techniques known to those of ordinary skill in the art. Although the same methodology could also be applied to the color information.

Figure 4:
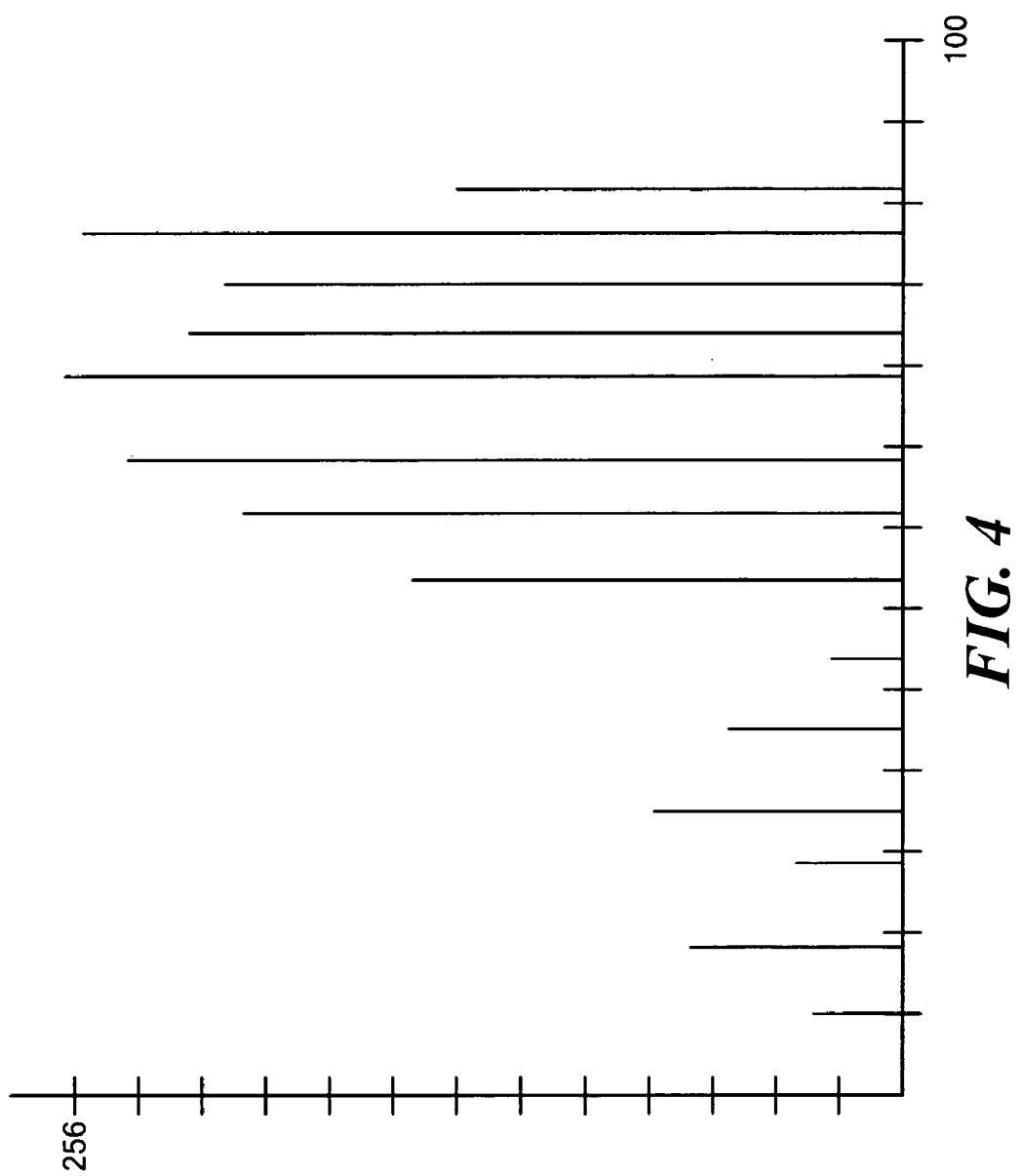
FIG. 4 is a sample histogram.

First, a histogram of the digital image data forming a first image in a sequence of images is produced 300. A sample histogram is shown in FIG. 4. The number of occurrences of a value is represented on the vertical axis and the greyscale values are represented on the horizontal axis. This histogram thus indicates how many times intensity occurs for a given image. The histogram provides a weighting to allow a user to select the low intensity levels. In general the high intensity values will predominate and the less visible values (low intensity values) will be much smaller both in intensity and generally in number of occurrences. Thus, the visible values can be readily identified and removed through filtering or other techniques known to one of ordinary skill in the art.

In one embodiment, the computer system allows a user to view the histogram and determine the low level intensity light portions from the graphical representation of the histogram 310. Low light intensity levels are those which result from visible light but which would not be perceived by the human eye if displayed on a display device. The user then selects a filter and filters out all other light (high intensity light) 320. Normally the low level intensity light can be visually determined and selected by a user of the computer system. Once the high intensity light is filtered out, the low level light is re-mapped to higher level values so that a display device will display the re-mapped values 330. These values are also spread out so that the contrast is more dramatic. For example, if the cut off between low and high intensity is 40 on a scale from 0–255 and the values are being mapped between 135 and 255, contrast is increased by three such that a value of 1 and 2 would not be 135 and 139. The two mapped low intensity levels are then displayed to a user of the system 340. If the object represented by the low intensity levels is visible, the user responds that the image is unacceptable 350. The user indicates this through a user input device such as a keyboard or mouse. The method then provides for the user to either re-determine the threshold between low and high intensity levels or provide for a new remapping of the low intensity values such that the values are either brighter, more contrast is provided between values or both. The system may also let the user select a new value for separating between a low-level intensity value and high-level intensity value 350. If the user indicates that the concealed object is visible, the process ends.

Figure 5:
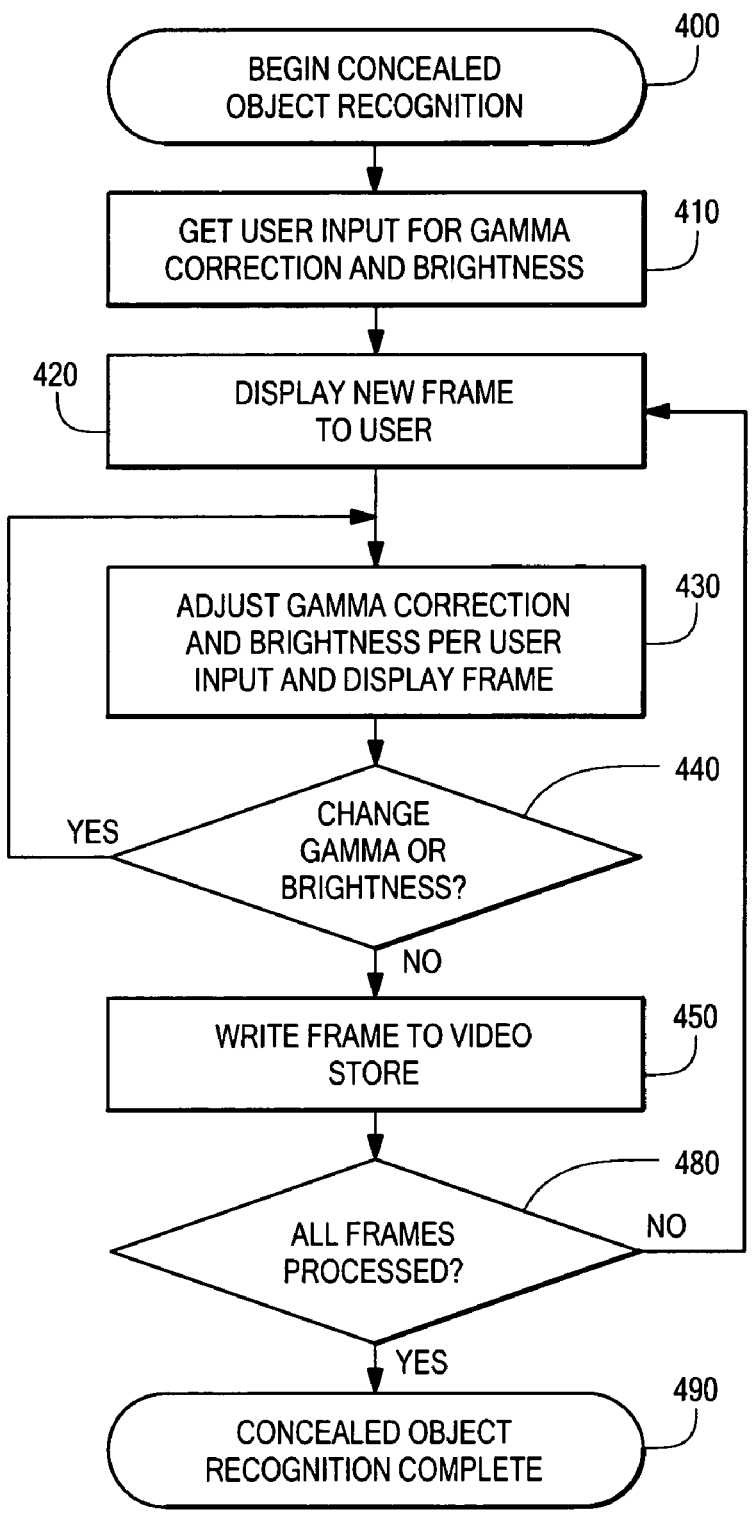
FIG. 5 is a flow chart showing one method for implementing concealed object recognition.
Figure 6:
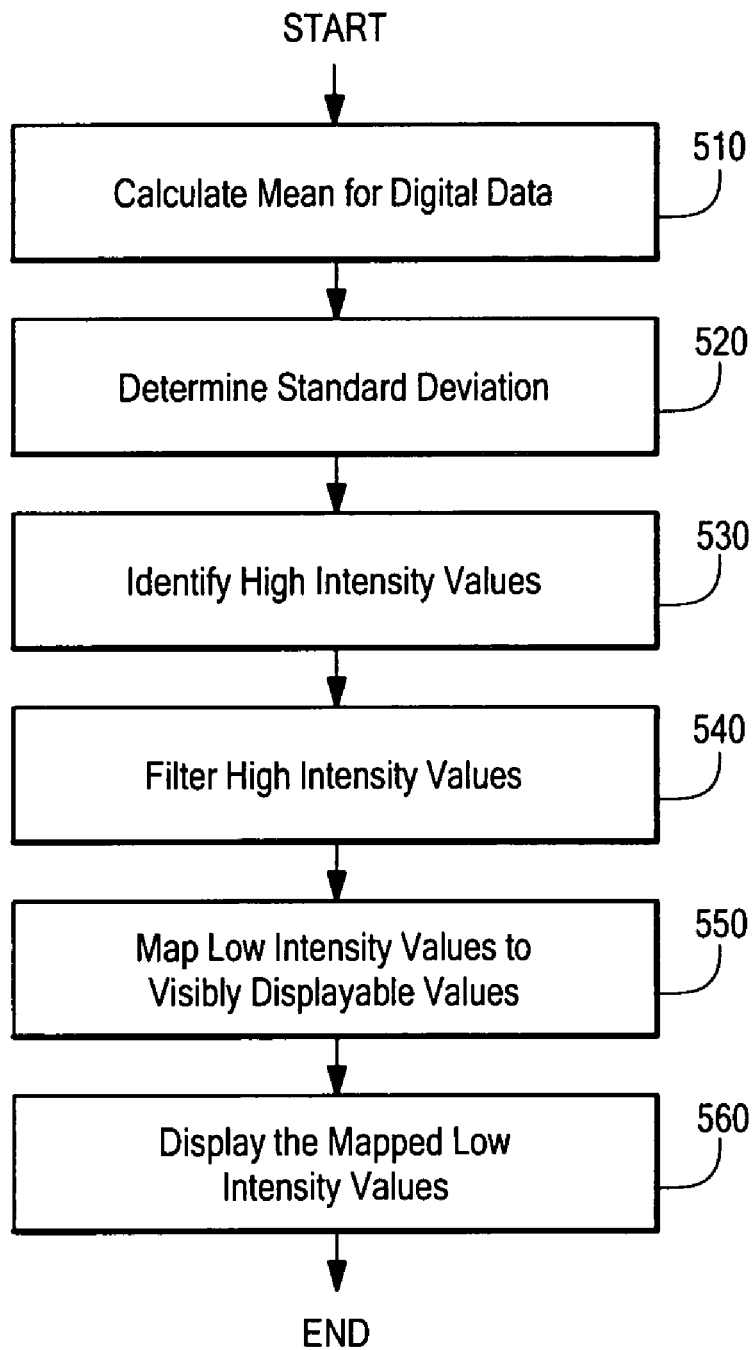
FIG. 6 is a flow chart showing an automated version of the method for concealed object recognition.

The process may also be achieved by increasing gamma correction and/or brightness as shown in FIG. 5, first the brightness and/or the gamma correction value is applied to the digital image data 410. By increasing the brightness level, the high level intensity light eventually saturates toward white, thus filtering the high level intensity light. All values that are saturated can then be removed leaving the low level values. The gamma correction can then be used to increase the remaining values. Adjusting gamma increases the intensity values without over amplifying the noise that occurs by just increasing brightness proportionally across all values. Increasing the gamma increases the intensity in a non-linear fashion such that the new intensity is:

$$\text{new intensity} = \left(\frac{\text{current intensity}}{255}\right)^{\frac{1}{gamma}}$$

Because of the non-linear nature of gamma correction, the noise is also increased in a non-linear fashion.

In this embodiment of the invention, the gamma correction value applied must be greater in value than is normally used with a cathode ray tube ("CRT") display Typically the gamma correction value should be between six to ten for this embodiment wherein a standard cathode display has a gamma correction value of approximately 2.2–2.5 and prior art video editing software have maximum gamma correction values of 5.

Once a filter has been applied to the video image data and the low level intensity video image data has been amplified, the low level intensity video image data representing the current frame is displayed 420 to the user. The data that is displayed to the user may also include some of the high level intensity video data. The user can then interactively change 430 the gamma and brightness values and the resulting values are again displayed to the user. Through this process, the image represented by a low level light is displayed. When the image is satisfactory, the user causes the computer system to write the altered video data of the frame 450 to the video store. Succeeding video frames are processed in a similar manner until all frames have been processed 480. Concealed object recognition is then complete 490.

In a first example of the method for concealed object recognition, an image of a person wearing a black shirt with a white gun underneath is analyzed. A digital image is captured of the person under normal lighting conditions. If the digital image is displayed on a display device, the human eye can only see a black shirt which has a value of zero for the pixels displayed on the screen. The light that is reflected through by the white gun is muted in the process and thus may be of such an intensity level that is not perceivable by the human eye. Although the light is not perceivable, the light information is captured by the sensor of the digital image device. If gamma and brightness are increased the black values will not increase. However, the slight amount of light coming from the white gun will be amplified since it is not a zero value. Some noise will also be amplified and thus displayed, but if enough light, preferably 500 Lux or more, is available to the camera, the system will clearly show the white gun. In another example, an image of a person wearing a white shirt with a black gun underneath is analyzed. In such an image, the video is inverted thus filtering the high intensity data, such that the shirt now appears black and therefore provides a 0 intensity value. The low level intensity data is then mapped to a range in which the values are in the visible range, for example, between 100–255 on a scale from 0–255. This may be achieved by first converting the data to greyscale data or using the color-based data that is the result of the digital imaging sensor. Additionally, the values are spaced such that the distance between values is increased, thus making contrast perceptions more likely to the human eye.

In a third example, an image of a person wearing a dark grey shirt and having a light grey gun underneath the shirt is analyzed. The intensity level corresponding to the dark grey suit is decreased such that it is set to black. The light grey gun will then be at some value which is above that of black. The values corresponding to the light grey gun as well as noise can then be increased using either brightness or gamma correction, thus the low-light values of the light grey gun are filtered and mapped to values which are perceivable by the human eye, as previously explained.

This process can be automated as shown in FIG. 5. In one variation, the mean for all the digital data of the image is computed 510. The mean determines where the high intensity values are. Next a standard deviation from the mean is determined 520. All of the values within one standard deviation below the mean are then identified as high intensity values as well as all values above the mean 530. The high intensity values are then filtered and thus removed from the digital data set that makes up the image 540. The low level values are then mapped to values that are visible 550. The spacing between values is also increased such that the contrast between values is more perceptible to the human eye. For example, the automated system may determine the lowest and highest value within the low level values and subtract the two values to determine the range. This range is then mapped to a visible light range. For example, if the scale is between 0–255 and the low level values are between 1–41 the range is 40. Values above 80 are normally perceivable to the human eye so the range of 40 would be mapped to a range of 175 (80–255). Thus, all values from the low level light would extend between the values of 80 and 255. The low level data values are then displayed on a display device. 560.

The system may be further automated to change the color data to greyscale data for processing. It should be understood, that although the data may be converted to grayscale for determining high intensity and low intensity values, the color information is still maintained and may be used for the remapping of the low intensity values, such that, the low intensity values may be displayed in color after being remapped to visible values.

The camera angle should be within plus or minus 40 degrees of normal to the object for best results. If the outside clothing is very light or white, then the video may be inverted so that light objects become dark and contrasting objects underneath the porous materials are detected. An ambient light condition of 500 Lux or greater should illuminate the object under study.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

We claim:

1. A method for viewing a first object having a contrasting color to a second object, wherein the second object obstructs visibility of the first object, wherein visible light passes through the second object, the method comprising:
   receiving digital image data representative of the first object obstructed by the second object into a computer system; wherein the digital image data contains at least first object data and second object data produced by visible light and each datum has an associated value;
   substantially filtering out the second object data; and
   increasing the value of the first object data until visibly displayable.

2. The method according to claim 1, further comprising creating a histogram of the digital image data; and
   selecting the second object data based upon the histogram.

3. The method according to claim 2 wherein the process is automated.

4. The method according to claim 1, wherein substantially filtering out the second object data and increasing the first object data is achieved at least by increasing gamma correction.

5. The method according to claim 4 wherein the gamma correction is set above 2.5.

6. The method according to claim 4 wherein the gamma correction is set at or above 6.

7. The method according to claim 1, wherein increasing the first object data includes mapping the first object data to values such that the contrast between data levels is such that a human eye can detect the contrast when the first object data is displayed on a display device.

8. The method according to claim 7, wherein mapping is performed such that the mapping is to data values which when displayed by a display device are observable to the human eye.

9. The method according to claim 1, wherein increasing the first object data is achieved at least by increasing brightness.

10. The method according to claim 1, wherein the first object and the second object have contrasting colors.

11. The method according to claim 1, wherein the first object and the second object have contrasting colors which average more than 25 levels apart on a 256 level scale.

12. The method according to claim 1, wherein the image data is represented on a scale of values and wherein the first object and the second object have contrasting colors such that the colors of the first object data and the second object data vary approximately by ten percent of the scale.

13. The method according to claim 1, wherein the process is automated.

14. The method according to claim 1, wherein the first object data and the second object data contain color information.

15. The method according to claim 14, further comprising:
   converting the color information from the first object data and the second object data to greyscale.

16. A method for displaying first object data representative of a first object in a digital image on a display device wherein the first object is obstructed by a second object, visible light passing through the second object, the first object and the second object having contrasting colors, the method comprising:
   receiving digital data representative of the digital image into a computer system; and
   filtering the first and second object data such that the first object data is visibly displayed on the display device and the second object data is clipped.

17. The method according to claim 16, further comprising:
taking a digital image of the first object and the second object using a visible light sensor that produces the first object data and the second object data.

18. The method according to claim 16, wherein filtering comprises:
mapping the first object data to a scale such that contrasts between data values when displayed are visible to a human eye.

19. The method according to claim 16, further comprising:
displaying the first object data on a display device.

20. The method according to claim 19, further comprising:
providing manual adjustment of the filtering after displaying the first object data on the display device.

21. The method according to claim 16 wherein filtering includes:
creating a visually displayable histogram of the digital data representative of the digital image;
providing user selection of a group of the digital data representative of the digital image;
removing the selected group from the digital data representative of the digital image; and
adjusting data values of the remaining digital data by applying gamma correction to the digital data by increasing a gamma correction value until the first object is displayable when the digital data is displayed on a display device.

22. The method according to claim 16, wherein the first object data and the second object data contain color information.

23. The method according to claim 22, further comprising:
converting the color information of the first object data and the second object data to greyscale.

24. The method according to claim 23, wherein if the second object is darker than the first object, adjusting at least the second object data until substantially all of the second object data produces zero output when represented on a display.

25. The method according to claim 23, wherein if the second object is substantially lighter than the first object, inverting the first and second object data such that the second object appears darker when represented on a display device.

26. The method according to claim 25, adjusting at least the second object data until substantially all of the second object data produces zero output when represented on a display.

27. The method according to claim 25 further comprising:
mapping the first object data to data values such that the data values when presented on a display are visible and scaling between data values is increased over scaling between the first object data.

28. The method according to claim 26 further comprising:
mapping the first object data to data values such that the data values when presented on a display are visible and scaling between data values is increased over scaling between the first object data.

29. A computer program product having computer readable program code on a storage medium for use with a computer for viewing first object data representative of a first object having a contrasting color to a second object, wherein the second object obstructs visibility of the first object, wherein the visible light passes through the second object, the computer readable program code comprising:
computer code for receiving digital image data representative of the first object obstructed by the second object into a computer system; wherein the digital image data contains at least first object data and second object data produced by visible light;
computer code for substantially filtering out the second object data; and
computer code for increasing the first object data until visibly displayable.

30. The computer program product according to claim 29, further comprising:
computer code for creating a histogram of the digital image data; and
computer code for selecting the second object data based upon the histogram.

31. The computer program product according to claim 29, wherein the computer code for substantially filtering out the second object data and increasing the first object data increases gamma correction.

32. The computer program product according to claim 31 wherein the gamma correction is set above 2.5.

33. The computer program product according to claim 31 wherein the gamma correction is set at or above 6.

34. The computer program product according to claim 29 wherein the computer code for increasing the first object data includes computer code for mapping the first object data to values such that the contrast between data levels is such that a human eye can detect the contrast.

35. The computer program product according to claim 34, wherein the computer code for mapping is performed such that the mapping is to data values which when displayed by a display device are observable to the human eye.

36. The computer program product according to claim 29, wherein the computer code for increasing the first object data increases the first object data at least by increasing brightness.

37. The computer program product to claim 29, wherein the first object and the second object have contrasting colors.

38. The computer program product according to claim 29, wherein the first object and the second object data represent contrasting colors which average more than 25 levels on a 256 level scale.

39. The computer program according to claim 29, wherein the image data is associated with a scale and the first object and the second object have contrasting colors such that the first object data and the second object data vary substantially by ten percent of the scale.

40. The computer program product according to claim 29, wherein the first object data and the second object data contain color information and the computer program product further includes computer code for converting the color information from the first object data and the second object data to greyscale.

41. A computer program product having computer code on a computer readable medium for use with a computer for displaying first object data representative of a first object in a digital image on a display device wherein the first object is obstructed by a second object, visible light passing through the second object, the first object and the second object having contrasting colors, the computer code comprising:
computer code for receiving digital data representative of the digital image into a computer system; and computer code for filtering the first and second object data such that the first object data is visibly displayed on the display device and the second object data is clipped.

42. The computer program product according to claim 41, wherein the computer code for filtering includes:
   computer code for mapping the first object data to a scale such that contrasts between data values when displayed are visible to a human eye.

43. The computer program product according to claim 41, further comprising:
   computer code for displaying the first object data on a display device.

44. The computer program product according to claim 41, further comprising:
   computer code for providing user adjustment of the filtering after displaying the first object data on the display device.

45. The computer program product according to claim 41 wherein the computer code for filtering includes:
   computer code for creating a visually displayable histogram of the digital data representative of the digital image;
   computer code for providing user selection of a group of the digital data representative of the digital image;
   computer code for removing the selected group from the digital data representative of the digital image; and
   computer code for adjusting data values of the remaining digital data by applying gamma correction to the digital data by increasing a gamma correction value until the first object is displayable when the digital data is displayed on a display device.

46. The computer program product according to claim 41, wherein the first object data and the second object data contain color information and wherein the computer program product further comprises:
   computer code for converting the color information of the first object data and the second object data to greyscale.

47. The computer program product according to claim 46, further comprising computer code for adjusting at least the second object data until substantially all of the second object data produces zero output when represented on a display if the second object is darker than the first object.

48. The computer program product according to claim 46, further comprising computer code for inverting the first and second object data such that the second object appears darker when represented on a display device if the second object is substantially lighter than the first object.

49. The computer program product according to claim 48, further comprising computer code for adjusting at least the second object data until substantially all of the second object data produces zero output when represented on a display.

50. The computer program product according to claim 49 further comprising:
   computer code for mapping the first object data to data values such that the data values when presented on a display are visible and scaling between data values is increased over scaling between the first object data.

51. The computer program product according to claim 48 further comprising:
   computer code for mapping the first object data to data values such that the data values when presented on a display are visible and scaling between data values is increased over scaling between the first object data.

* * * * *